United States Patent
Dorum

(10) Patent No.: US 10,719,719 B2
(45) Date of Patent: Jul. 21, 2020

(54) METHOD, APPARATUS, AND COMPUTER PROGRAM PRODUCT FOR DETERMINING IF PROBE DATA POINTS HAVE BEEN MAP-MATCHED

(71) Applicant: HERE GLOBAL B.V., Eindhoven (NL)

(72) Inventor: Ole Henry Dorum, Chicago, IL (US)

(73) Assignee: HERE Global B.V., Eindhoven (NL)

( * ) Notice: Subject to any disclaimer, the term of this patent is extended or adjusted under 35 U.S.C. 154(b) by 224 days.

(21) Appl. No.: 15/910,494

(22) Filed: Mar. 2, 2018

(65) Prior Publication Data
US 2019/0272434 A1 Sep. 5, 2019

(51) Int. Cl.
*G06K 9/00* (2006.01)
*G06K 9/62* (2006.01)
*G01C 21/30* (2006.01)

(52) U.S. Cl.
CPC ....... *G06K 9/00798* (2013.01); *G06K 9/6212* (2013.01); *G06K 9/6284* (2013.01); *G01C 21/30* (2013.01)

(58) Field of Classification Search
CPC ........ G01C 21/32; G01C 21/30; G01C 21/26; G01C 21/36; G01C 21/3492; G01C 21/00; G06F 16/29; G08G 1/0112; G08G 1/0141; G08G 1/0129
See application file for complete search history.

(56) References Cited

U.S. PATENT DOCUMENTS

| | | | |
|---|---|---|---|
| 6,385,539 B1* | 5/2002 | Wilson | G01C 21/30 340/905 |
| 9,293,040 B2 | 3/2016 | Kwon et al. | |
| 9,355,560 B2 | 5/2016 | Stenneth et al. | |
| 2016/0239983 A1* | 8/2016 | Dorum | G06T 11/20 |
| 2017/0307386 A1 | 10/2017 | Stess | |
| 2017/0314934 A1 | 11/2017 | Averbuch et al. | |

OTHER PUBLICATIONS

Brouwer, J., *Measuring Real-Time Traffic Data Quality Based on Floating Car Data*, ATEC ITS France Congress; Paris, France (Jan. 29, 2014); 8 pages.

* cited by examiner

*Primary Examiner* — Ross Varndell
(74) *Attorney, Agent, or Firm* — Alston & Bird LLP

(57) ABSTRACT

A method, apparatus, and computer program product are provided for determining whether probe data points are map-matched or non-map-matched such that the probe data can be processed and analyzed appropriately without introducing bias into the analysis which may be caused by map-matching ahead of analysis. A mapping system includes a memory having map data stored therein, and processing circuitry. The processing circuitry may be configured to receive probe data points associated with a plurality of vehicles. Each probe data point is received from a probe apparatus of a plurality of probe apparatuses. The probe apparatus includes a plurality of sensors and being onboard a respective vehicle. Each probe data point includes location information associated with the respective probe apparatus.

17 Claims, 7 Drawing Sheets

METHOD, APPARATUS, AND COMPUTER PROGRAM PRODUCT FOR DETERMINING IF PROBE DATA POINTS HAVE BEEN MAP-MATCHED

TECHNOLOGICAL FIELD

An example embodiment of the present invention relates to determining whether probe data points have been map-matched or if they are in raw-data form, and more particularly, to analyzing a plurality of probe data points to establish those that are map-matched and those that are not.

BACKGROUND

Service providers and device manufacturers (e.g., wireless, cellular, navigation, etc.) are continually challenged to deliver value and convenience to consumers by providing compelling and useful services. Location-based services have been developed to provide users with useful and relevant information regarding route planning and to facilitate route guidance along the way. Substantially static data regarding roadways is used in conjunction with dynamic data, such as traffic, construction, and incident information to provide accurate and timely information to a driver to help route planning and decision-making.

Data received from infrastructure monitoring systems and crowd-sourced data has become ubiquitous and may be available for facilitating route guidance and navigation system information. However, this data can be mined to provide various other services to users and to grow the availability of location-based services.

BRIEF SUMMARY

A method, apparatus, and computer program product are provided in accordance with an example embodiment described herein for determining whether probe data points are map-matched or non-map-matched such that the probe data can be processed and analyzed appropriately without introducing bias into the analysis which may be caused by map-matching ahead of analysis. An example embodiment may provide a mapping system including a memory having map data stored therein, and processing circuitry. The processing circuitry may be configured to receive probe data points associated with a plurality of vehicles, each probe data point received from a probe apparatus of a plurality of probe apparatuses, each probe apparatus including a one or more sensors and being onboard a respective vehicle, where each probe data point includes location information associated with the respective probe apparatus. The processing circuitry may further be configured to: determine a location and a road segment corresponding to the location of each of the probe data points; generate, from the probe data points associated with a first road segment, a probe density histogram for the first road segment, where the probe density histogram represents a volume of probe data points at each of a plurality of positions across a width of the road segment; identify, based on the probe density histogram, probe data points that are determined to be map-matched and classify the probe data points determined to be map-matched as map-matched probe data points; identify, based on the probe density histogram, probe data points that are determined to be non-map-matched and classify the probe data points determined to be non-map-matched as non-map-matched probe data points. The probe data points classified as map-matched may be analyzed with respect to a position of a road segment of a digital map corresponding to the map-matched road segment. The probe data points classified as non-map-matched may be analyzed to establish one or more of lane position, lane-based traffic flow, or road centerline accuracy.

The probe data points associated with a plurality of vehicles may be received from a probe data provider, where the probe data provider may be classified according to whether the probe data provided is classified as map-matched, as non-map-matched, or as a combination of map-matched and non-map-matched. In response to the probe data provider being classified as providing a combination of map-matched and non-map-matched probe data, the processing circuitry may be configured to determine a proportion of the probe data points classified as map-matched, and a proportion of the probe data points classified as non-map-matched, and to classify the probe data provider according to the proportions determined. The probe data points may be grouped into bins at each of the plurality of positions across the width of the road segment. The processing circuitry configured to identify probe data points that are determined to be map-matched may include processing circuitry configured to: identify a relatively high proportion of probe data points grouped to at least one of the plurality of positions across the width of the road segment, where the relatively high proportion of probe data points is established based on a statistically significant deviation at the at least one of the plurality of positions across the width of the road segment relative to the probe density histogram adjacent the at least one of the plurality of positions; and identify the probe data points grouped to the at least one of the plurality of positions across the width of the road segment as map-matched and classify the probe data points grouped to the at least one of the plurality of positions as map-matched probe data points.

According to some embodiments, the processing circuitry may be configured to: identify a peak in the probe density histogram; assign probe data points at a position across the width of the road segment corresponding to the peak in the probe density histogram a peak value; assign probe data points at positions along the width of the road segment values corresponding to their position relative to the peak in the probe density histogram, where values assigned are inversely proportional to a distance of the position across the width of the road segment from the peak; and causing the processing circuitry to identify, based on the probe density histogram, probe data points that are determined to be map-matched and classify the probe data points determined to be map-matched as map-matched probe data points by identifying probe data points having a value satisfying a predetermined threshold as map-matched probe data points.

The processing circuitry may be configured to calculate, for probe data points from each probe apparatus, a probability that the respective probe data points are map-matched based on a proportion of the probe data points from the respective probe apparatus corresponding to a peak in the probe density histogram, wherein a peak in the probe density histogram includes a relatively high proportion of probe data points grouped to at least one of the plurality of positions across the width of the road segment, where the relatively high proportion of probe data points may be established based on a statistically significant deviation at the at least one of the plurality of positions across the width of the road segment relative to the probe density histogram adjacent the at least one of the plurality of positions. The processing circuitry may be configured to determine a confidence value of the probability for the probe data points from each probe apparatus, where the confidence value is determined based on a number of probe data points from a respective probe apparatus, where the confidence value of the probability is proportional to a number of probe data points from the respective probe apparatus. The probe data points from a respective probe apparatus may be identified as map-matched in response to the probability that the respective probe data points are map-matched satisfying a predetermined probability and the confidence value of the probability for the probe data points from the respective probe apparatus satisfying a predetermined confidence value.

Embodiments provided herein may include an apparatus having at least one processor and at least one memory including computer program code. The computer program code may be configured to, with the processor, cause the apparatus to at least: receive probe data points associated with a plurality of vehicles, each probe data point received from a probe apparatus of a plurality of probe apparatuses, each probe apparatus one or more sensors and being onboard, attached, or otherwise associated with a respective vehicle, where each probe data point includes location information associated with the respective probe apparatus; for each of the probe data points, determine a location and a road segment corresponding to the location; generate, from the probe data points associated with a first road segment, a probe density histogram for the first road segment, where the probe density histogram represents a volume of probe data points at each of a plurality of positions across a width of the road segment; identify, based on the probe density histogram, probe data points that are determined to be map-matched and classify the probe data points determined to be map-matched as map-matched probe data points; identify, based on the probe density histogram, probe data points that are determined to be non-map-matched and classify the probe data points determined to be non-map-matched as non-map-matched probe data points. The data points classified as map-matched may be analyzed with respect to a position of a road segment of a digital map corresponding to the map-matched road segment. The probe data points classified as non-map-matched may be analyzed to establish one or more of lane position, lane-based traffic flow, or road centerline accuracy.

According to some embodiments, the probe data points associated with a plurality of vehicles may be received from a probe data provider, where the probe data provider may be classified according to whether the probe data provided is classified as map-matched, as non-map-matched, or as a combination of map-matched and non-map-matched. In response to the probe data provider being classified as providing a combination of map-matched and non-map-matched probe data, a proportion of the probe data points classified as map-matched and a proportion of the probe data points classified as non-map-matched may be determined, and the probe data provider may be classified according to the proportions determined. The probe data points may be grouped into bins at each of the plurality of positions across the width of the road segment, where the apparatus caused to identify probe data points that are determined to be map-matched includes causing the apparatus to: identify a relatively high proportion of probe data points grouped to at least one of the plurality of positions across the width of the road segment, where the relatively high proportion of probe data points may be established based on a statistically significant deviation at the at least one of the plurality of positions across the width of the road segment relative to the probe density histogram adjacent the at least one of the plurality of positions; and identify the probe data points grouped to the at least one of the plurality of positions across the width of the road segment as map-matched and classify the probe data points grouped to the at least one of the plurality of positions as map-matched probe data points.

The apparatus of some embodiments may be caused to: identify a peak in the probe density histogram; assign probe data points at a position across the width of the road segment corresponding to the peak in the probe density histogram a peak value; assign probe data points at positions along the width of the road segment values corresponding to their position relative to the peak in the probe density histogram, where values assigned are inversely proportional to a distance of the position across the width of the road segment from the peak; and where causing the processing circuitry to identify, based on the probe density histogram, probe data points that are determined to be map-matched and classify the probe data points determined to be map-matched as map-matched probe data points includes identifying probe data points having a value satisfying a predetermined threshold as map-matched probe data points.

The apparatus of example embodiments may be configured to calculate, for probe data points from each probe apparatus, a probability that the respective probe data points are map-matched based on a proportion of the probe data points from the respective probe apparatus corresponding to a peak in the probe density histogram, wherein a peak in the probe density histogram includes a relatively high proportion of probe data points grouped to at least one of the plurality of positions across the width of the road segment, where the relatively high proportion of probe data points may be established based on a statistically significant deviation at the at least one of the plurality of positions across the width of the road segment relative to the probe density histogram adjacent the at least one of the plurality of positions. The apparatus may be configured to determine a confidence value of the probability for the probe data points from each probe apparatus, where the confidence value is determined based on a number of probe data points from a respective probe apparatus, where the confidence value of the probability is proportional to a number of probe data points from the respective probe apparatus. The probe data points from a respective probe apparatus may be identified as map-matched in response to the probability that the respective probe data points are map-matched satisfying a predetermined probability and the confidence value of the probability for the probe data points from the respective probe apparatus satisfying a predetermined confidence value.

Embodiments described herein may provide a computer program product including at least one non-transitory computer-readable storage medium having computer-executable program code portions stored therein. The computer-executable program code portions include program code instructions configured to: receive probe data points associated with a plurality of vehicles, each probe data point received from a probe apparatus of a plurality of probe apparatuses, each probe apparatus including one or more sensors and being onboard, associated with, or otherwise attached to a respective vehicle, where each probe data point includes location information associated with the respective probe apparatus; for each of the probe data points, determine a location and a road segment corresponding to the location; generate, from the probe data points associated with a first road segment, a probe density histogram for the first road segment, where the probe density histogram represents a volume of probe data points at each of a plurality of positions across a width of the road segment; identify, based on the probe density histogram, probe data points that are determined to be map-matched and classify the probe data points determined to be map-matched as map-matched probe data points; and identify, based on the probe density histogram, probe data points that are determined to be non-map-matched and classify the probe data points determined to be non-map-matched as non-map-matched probe data points. The probe data points classified as map-matched may be analyzed with respect to a position of a road segment of a digital map corresponding to the map-matched road segment. The probe data points classified as non-map-matched may be analyzed to establish one or more of lane position, lane-based traffic flow, or road centerline accuracy.

The probe data points associated with a plurality of vehicles may be received from a probe data provider, where the probe data provider may be classified according to whether the probe data provider is classified as map-matched, as non-map-matched, or as a combination of map-matched and non-map-matched. In response to the probe data provider being classified as providing a combination of map-matched and non-map-matched probe data, determining a proportion of the probe data points classified as map-matched and a proportion of the probe data points classified as non-map-matched, and classifying the probe data provider according to the proportions determined. The probe data points may be grouped into bins at each of the plurality of positions across the width of the road segment, where the processing circuitry configured to identify probe data points that are determined to be map-matched may include program code instructions configured to: identify a relatively high proportion of probe data points grouped to at least one of the plurality of positions across the width of the road segment, where the relatively high proportion of probe data points may be established based on a statistically significant deviation at the at least one of the plurality of positions across the width of the road segment relative to the probe density histogram adjacent the at least one of the plurality of positions; and identify the probe data points grouped to the at least one of the plurality of positions across the width of the road segment as map-matched and classify the probe data points grouped to the at least one of the plurality of positions as map-matched probe data points.

Embodiments of the computer program product described herein may include program code instructions configured to: identify a peak in the probe density histogram; assign probe data points at a position across the width of the road segment corresponding to the peak in the probe density histogram a peak value; assign probe data points at positions along the width of the road segment values corresponding to their position relative to the peak in the probe density histogram, where values assigned are inversely proportional to a distance of the position across the width of the road segment from the peak; and where causing the processing circuitry to identify, based on the probe density histogram, probe data points that are determined to be map-matched and classify the probe data points determined to be map-matched probe data points comprises identifying probe data points having a value satisfying a predetermined threshold as map-matched probe data points.

The computer program product of example embodiments may include program code instructions to calculate, for probe data points from each probe apparatus, a probability that the respective probe data points are map-matched based on a proportion of the probe data points from the respective probe apparatus corresponding to a peak in the probe density histogram, wherein a peak in the probe density histogram includes a relatively high proportion of probe data points grouped to at least one of the plurality of positions across the width of the road segment, where the relatively high proportion of probe data points may be established based on a statistically significant deviation at the at least one of the plurality of positions across the width of the road segment relative to the probe density histogram adjacent the at least one of the plurality of positions. The computer program product may include program code instructions configured to determine a confidence value of the probability for the probe data points from each probe apparatus, where the confidence value is determined based on a number of probe data points from a respective probe apparatus, where the confidence value of the probability is proportional to a number of probe data points from the respective probe apparatus. The probe data points from a respective probe apparatus may be identified as map-matched in response to the probability that the respective probe data points are map-matched satisfying a predetermined probability and the confidence value of the probability for the probe data points from the respective probe apparatus satisfying a predetermined confidence value.

Embodiments provided herein may include a method for establishing whether probe data points are map-matched or not. Methods may include: receiving probe data points associated with a plurality of vehicles, each probe data point received from a probe apparatus of a plurality of probe apparatuses, each probe apparatus one or more sensors and being onboard, attached, or otherwise associated with a respective vehicle, where each probe data point includes location information associated with the respective probe apparatus; for each of the probe data points, determining a location and a road segment corresponding to the location; generating, from the probe data points associated with a first road segment, a probe density histogram for the first road segment, where the probe density histogram represents a volume of probe data points at each of a plurality of positions across a width of the road segment; identifying, based on the probe density histogram, probe data points that are determined to be map-matched and classify the probe data points determined to be map-matched as map-matched probe data points; identifying, based on the probe density histogram, probe data points that are determined to be non-map-matched and classify the probe data points determined to be non-map-matched as non-map-matched probe data points. The data points classified as map-matched may be analyzed with respect to a position of a road segment of a digital map corresponding to the map-matched road segment. The probe data points classified as non-map-matched may be analyzed to establish one or more of lane position, lane-based traffic flow, or road centerline accuracy.

According to some embodiments, the probe data points associated with a plurality of vehicles may be received from a probe data provider, where the probe data provider may be classified according to whether the probe data provided is classified as map-matched, as non-map-matched, or as a combination of map-matched and non-map-matched. In response to the probe data provider being classified as providing a combination of map-matched and non-map-matched probe data, a proportion of the probe data points classified as map-matched and a proportion of the probe data points classified as non-map-matched may be determined, and the probe data provider may be classified according to the proportions determined. The probe data points may be grouped into bins at each of the plurality of positions across the width of the road segment, where the method of identifying probe data points that are determined to be map-matched includes: identifying a relatively high proportion of probe data points grouped to at least one of the plurality of positions across the width of the road segment, where the relatively high proportion of probe data points may be established based on a statistically significant deviation at the at least one of the plurality of positions across the width of the road segment relative to the probe density histogram adjacent the at least one of the plurality of positions; and identifying the probe data points grouped to the at least one of the plurality of positions across the width of the road segment as map-matched and classifying the probe data points grouped to the at least one of the plurality of positions as map-matched probe data points.

The method of some embodiments may include: identifying a peak in the probe density histogram; assigning probe data points at a position across the width of the road segment corresponding to the peak in the probe density histogram a peak value; assigning probe data points at positions along the width of the road segment values corresponding to their position relative to the peak in the probe density histogram, where values assigned are inversely proportional to a distance of the position across the width of the road segment from the peak; and where identifying, based on the probe density histogram, probe data points that are determined to be map-matched and classifying the probe data points determined to be map-matched as map-matched probe data points includes identifying probe data points having a value satisfying a predetermined threshold as map-matched probe data points.

The method of example embodiments may include calculating, for probe data points from each probe apparatus, a probability that the respective probe data points are map-matched based on a proportion of the probe data points from the respective probe apparatus corresponding to a peak in the probe density histogram, wherein a peak in the probe density histogram includes a relatively high proportion of probe data points grouped to at least one of the plurality of positions across the width of the road segment, where the relatively high proportion of probe data points may be established based on a statistically significant deviation at the at least one of the plurality of positions across the width of the road segment relative to the probe density histogram adjacent the at least one of the plurality of positions. Methods may include determining a confidence value of the probability for the probe data points from each probe apparatus, where the confidence value is determined based on a number of probe data points from a respective probe apparatus, where the confidence value of the probability is proportional to a number of probe data points from the respective probe apparatus. The probe data points from a respective probe apparatus may be identified as map-matched in response to the probability that the respective probe data points are map-matched satisfying a predetermined probability and the confidence value of the probability for the probe data points from the respective probe apparatus satisfying a predetermined confidence value.

Embodiments provided herein may include an apparatus having means for establishing whether probe data points are map-matched or not. The apparatus may include: means for receiving probe data points associated with a plurality of vehicles, each probe data point received from a probe apparatus of a plurality of probe apparatuses, each probe apparatus one or more sensors and being onboard, attached, or otherwise associated with a respective vehicle, where each probe data point includes location information associated with the respective probe apparatus; for each of the probe data points, means for determining a location and a road segment corresponding to the location; means for generating, from the probe data points associated with a first road segment, a probe density histogram for the first road segment, where the probe density histogram represents a volume of probe data points at each of a plurality of positions across a width of the road segment; means for identifying, based on the probe density histogram, probe data points that are determined to be map-matched and classify the probe data points determined to be map-matched as map-matched probe data points; means for identifying, based on the probe density histogram, probe data points that are determined to be non-map-matched and classify the probe data points determined to be non-map-matched as non-map-matched probe data points. The data points classified as map-matched may be analyzed with respect to a position of a road segment of a digital map corresponding to the map-matched road segment. The probe data points classified as non-map-matched may be analyzed to establish one or more of lane position, lane-based traffic flow, or road centerline accuracy.

According to some embodiments, the probe data points associated with a plurality of vehicles may be received from a probe data provider, where the probe data provider may be classified according to whether the probe data provided is classified as map-matched, as non-map-matched, or as a combination of map-matched and non-map-matched. In response to the probe data provider being classified as providing a combination of map-matched and non-map-matched probe data, a proportion of the probe data points classified as map-matched and a proportion of the probe data points classified as non-map-matched may be determined, and the probe data provider may be classified according to the proportions determined. The probe data points may be grouped into bins at each of the plurality of positions across the width of the road segment, where the means for identifying probe data points that are determined to be map-matched may include: means for identifying a relatively high proportion of probe data points grouped to at least one of the plurality of positions across the width of the road segment, where the relatively high proportion of probe data points may be established based on a statistically significant deviation at the at least one of the plurality of positions across the width of the road segment relative to the probe density histogram adjacent the at least one of the plurality of positions; and means for identifying the probe data points grouped to the at least one of the plurality of positions across the width of the road segment as map-matched and classifying the probe data points grouped to the at least one of the plurality of positions as map-matched probe data points.

The apparatus of some embodiments may include: means for identifying a peak in the probe density histogram; means for assigning probe data points at a position across the width of the road segment corresponding to the peak in the probe density histogram a peak value; means for assigning probe data points at positions along the width of the road segment values corresponding to their position relative to the peak in the probe density histogram, where values assigned are inversely proportional to a distance of the position across the width of the road segment from the peak; and where the means for identifying, based on the probe density histogram, probe data points that are determined to be map-matched and classifying the probe data points determined to be map-matched as map-matched probe data points includes means for identifying probe data points having a value satisfying a predetermined threshold as map-matched probe data points.

The apparatus of example embodiments may include means for calculating, for probe data points from each probe apparatus, a probability that the respective probe data points are map-matched based on a proportion of the probe data points from the respective probe apparatus corresponding to a peak in the probe density histogram, wherein a peak in the probe density histogram includes a relatively high proportion of probe data points grouped to at least one of the plurality of positions across the width of the road segment, where the relatively high proportion of probe data points may be established based on a statistically significant deviation at the at least one of the plurality of positions across the width of the road segment relative to the probe density histogram adjacent the at least one of the plurality of positions. Apparatuses may include means for determining a confidence value of the probability for the probe data points from each probe apparatus, where the confidence value is determined based on a number of probe data points from a respective probe apparatus, where the confidence value of the probability is proportional to a number of probe data points from the respective probe apparatus. The probe data points from a respective probe apparatus may be identified as map-matched in response to the probability that the respective probe data points are map-matched satisfying a predetermined probability and the confidence value of the probability for the probe data points from the respective probe apparatus satisfying a predetermined confidence value.

BRIEF DESCRIPTION OF THE DRAWINGS

Figure 1:
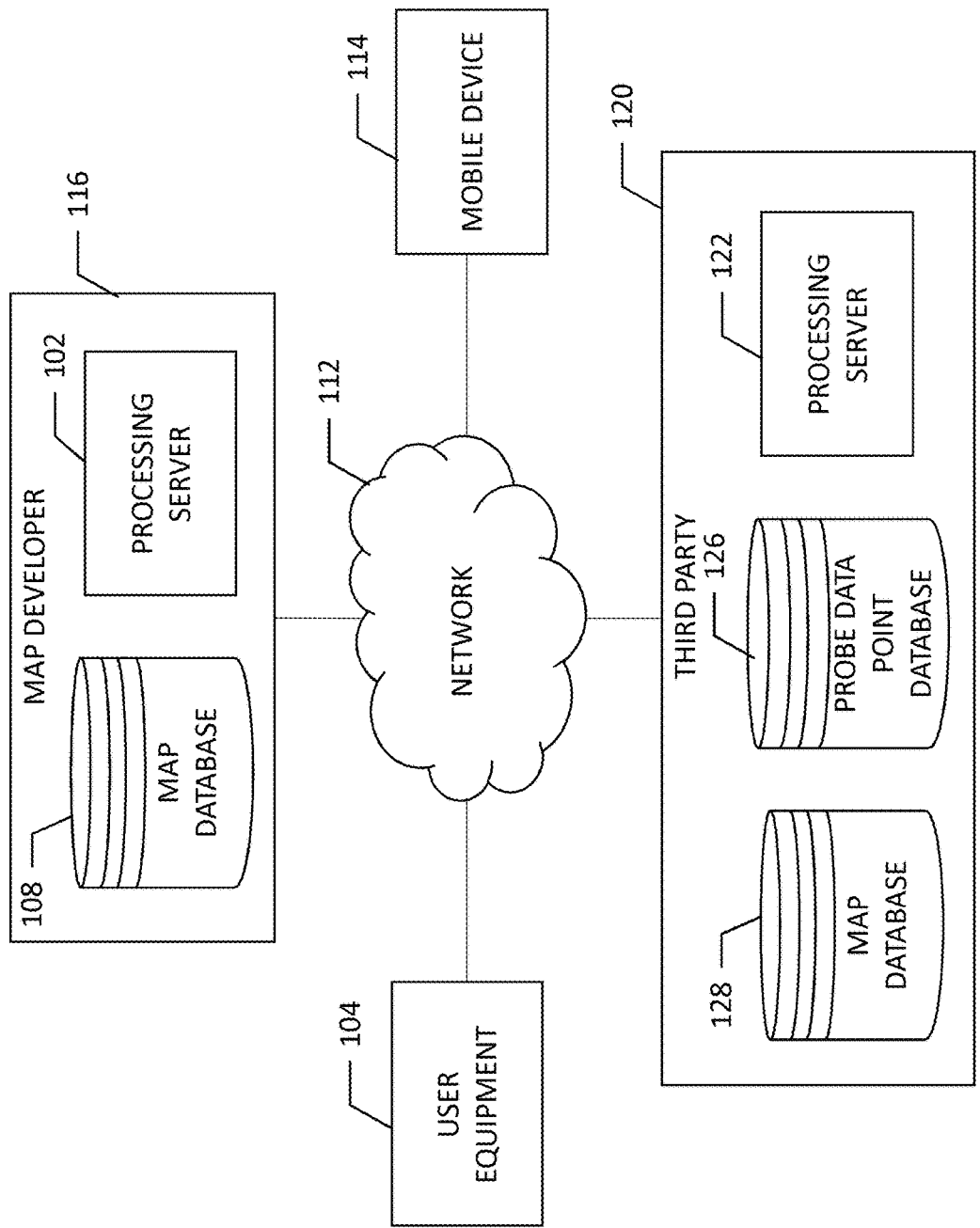
Figure 2:
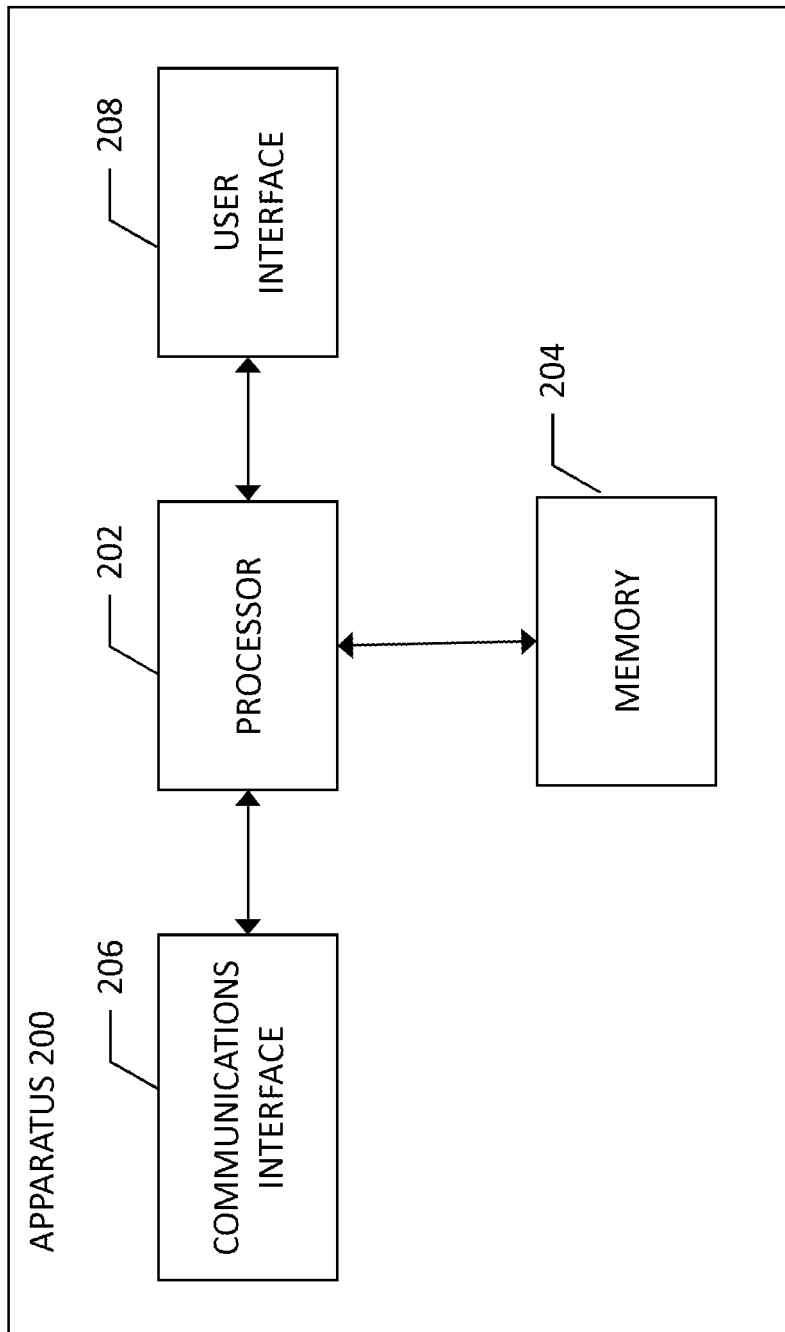
Figure 3:
Figure 4:
Figure 5:
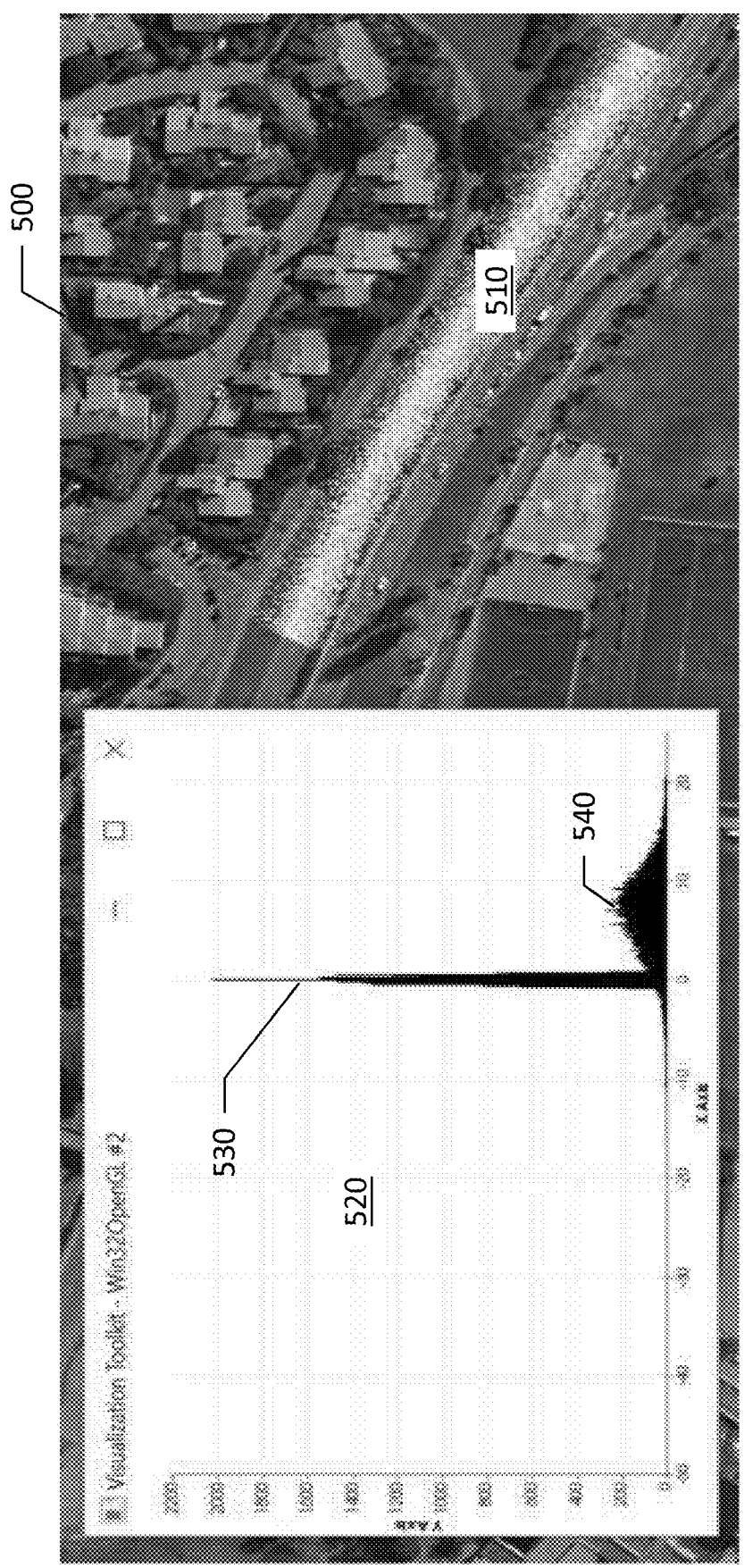
Figure 6:
Figure 7:
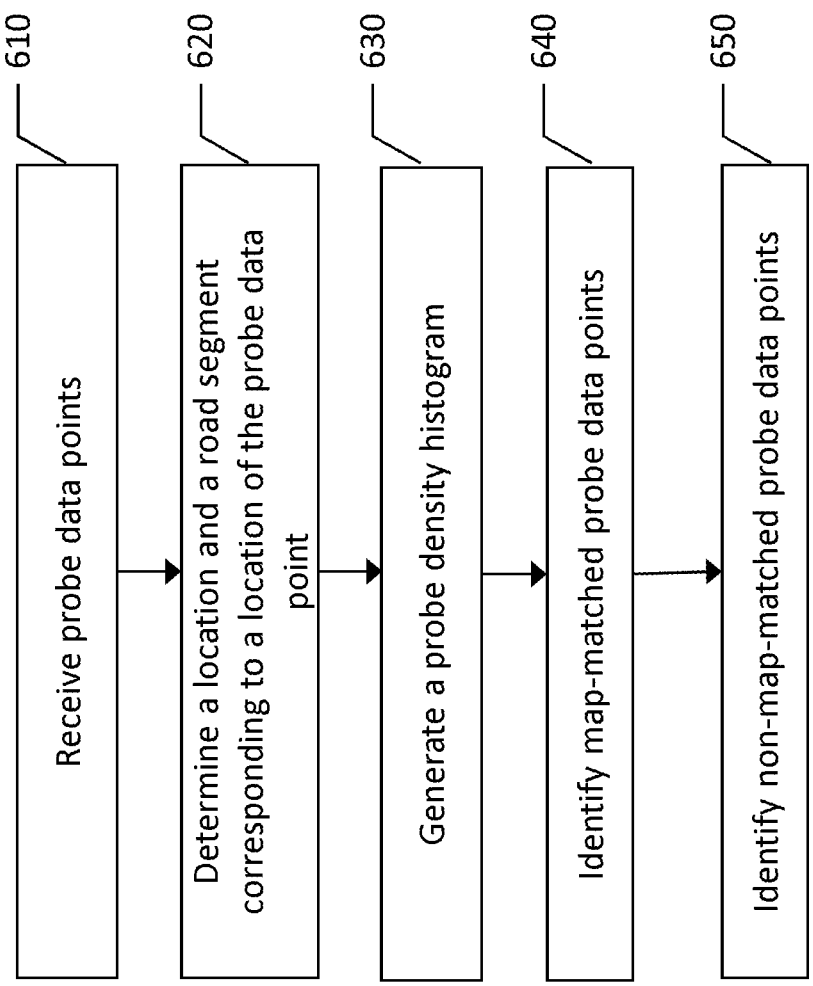

Having thus described example embodiments of the invention in general terms, reference will now be made to the accompanying drawings, which are not necessarily drawn to scale, and wherein:

FIG. 1 illustrates a communications diagram in accordance with an example embodiment of the present invention;

FIG. 2 is a block diagram of an apparatus that may be specifically configured for deciphering map-matched probe data points from non-map-matched probe data points in accordance with an example embodiment of the present invention;

FIG. 3 is a map representation of a plurality of map-matched probe data points for a plurality of probes gathered in the region represented by the map according to an example embodiment of the present invention;

FIG. 4 is a map representation of a plurality of both map-matched and non-map-matched probe data points for a plurality of probes gathered in the region represented by the map according to an example embodiment of the present invention;

FIG. 5 is a map depiction of a road segment including a plurality of both map-matched and non-map-matched probe data points and a probe data histogram associated with the road segment;

FIG. 6 is a map representation of a plurality of both map-matched and non-map-matched probe data points for a plurality of probes gathered in the region represented by the map and indicating a confidence of likelihood of the probe data points being map-matched according to an example embodiment of the present invention; and FIG. 7 is a flowchart of a method for determining whether probe data points are map-matched or non-map-matched according to an example embodiment of the present invention.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

As defined herein, a "computer-readable storage medium," which refers to a non-transitory physical storage medium (for example, volatile or non-volatile memory device), can be differentiated from a "computer-readable transmission medium," which refers to an electromagnetic signal.

A method, apparatus, and computer program product are provided herein in accordance with an example embodiment for determining whether probe data points received from a provider are map-matched to a road geometry or raw data, not map-matched to the road geometry. Further, according to some embodiments, a portion of probe data points received from a provider may be map-matched, such that embodiments described herein determine the portion of map-matched probe data points and the portion that are not map-matched. Distinguishing map-matched probe data points from non-map-matched probe data points is critical for establishing how the probe data points may be used in map creation, map revision, traffic estimation, lane-based traffic or geometry data, or the like. Both map-matched and non-map-matched probe data points may be useful in distinct manners; however, it is imperative to be able to separate the map-matched probe data points from the non-map-matched probe data points. An indication of whether probe data points have been map-matched or not is not typically provided by the provider of the probe data points such that it is desirable to establish a mechanism that determines whether the probe data points have been map-matched in a consistent, reliable, and efficient manner.

To determine probe data points that are map-matched and those that are not map-matched, a system as illustrated in FIG. 1 may evaluate probe data points and distinguish map-matched probe data points from non-map-matched probe data points. FIG. 1 illustrates a communication diagram of an example embodiment of a system for implementing example embodiments described herein. The illustrated embodiment of FIG. 1 includes a map developer system 116 including a processing server 102 and a geographic map database 108 in data communication with a user equipment (UE) 104 through a network 112, and one or more mobile devices 114. The mobile device 114 may be associated, coupled, or otherwise integrated with a vehicle, such as in a vehicle's head unit, infotainment unit, or an advanced driver assistance system (ADAS), for example. Additional, different, or fewer components may be provided. For example, many mobile devices 114 may connect with the network 112. The map developer 116 may include computer systems and a network of a system operator. The processing server 102 may include or otherwise be in communication with the map database 108, which may be embodied as a remote map server. The network may be wired, wireless, or any combination of wired and wireless communication networks, such as cellular, Wi-Fi, internet, local area networks, or the like.

The user equipment 104 may include a mobile computing device such as a laptop computer, tablet computer, mobile phone, smart phone, navigation unit, personal data assistant, watch, camera, or the like. Processing server 102 may be one or more fixed or mobile computing devices. The user equipment 104 may be configured to access the map database 108 via the processing server 102 through, for example, a mapping application, such that the user equipment may provide navigational assistance to a user among other services provided through access to the map developer 116.

The map database 108 may include node data, road segment data or link data, point of interest (POI) data, or the like. The map database 108 may also include cartographic data, routing data, and/or maneuvering data. According to some example embodiments, the road segment data records may be links or segments representing roads, streets, or paths, as may be used in calculating a route or recorded route information for determination of one or more personalized routes. The node data may be end points corresponding to the respective links or segments of road segment data. The road link data and the node data may represent a road network, such as used by vehicles, cars, trucks, buses, motorcycles, and/or other entities. Optionally, the map database 108 may contain path segment and node data records or other data that may represent pedestrian paths or areas in addition to or instead of the vehicle road record data, for example. The road/link segments and nodes can be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The map database 108 can include data about the POIs and their respective locations in the POI records. The map database 108 may include data about places, such as cities, towns, or other communities, and other geographic features such as bodies of water, mountain ranges, etc. Such place or feature data can be part of the POI data or can be associated with POIs or POI data records (such as a data point used for displaying or representing a position of a city). In addition, the map database 108 can include event data (e.g., traffic incidents, construction activities, scheduled events, unscheduled events, etc.) associated with the POI data records or other records of the map database 108.

The map database 108 may be maintained by a content provider e.g., a map developer. By way of example, the map developer can collect geographic data to generate and enhance the map database 108. There can be different ways used by the map developer to collect data. These ways can include obtaining data from other, third party sources, such as municipalities or respective geographic authorities, mobile phone service providers, vehicle manufacturers, navigation system developers/providers, or the like. In addition, the map developer can employ field personnel to travel by vehicle along roads throughout the geographic region to observe features and/or record information about them, for example. Also, remote sensing, such as aerial or satellite photography, can be used to generate map geometries directly or through machine learning.

The map database 108 may be a master map database stored in a format that facilitates updating, maintenance, and development. For example, the master map database or data in the master map database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data may be compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by user equipment 104, for example. The compilation to produce the end user databases can be performed by a party or entity separate from the map developer. For example, a customer of the map developer, such as a navigation device developer or other end user device developer, can perform compilation on a received map database in a delivery format to produce one or more compiled navigation databases.

As mentioned above, the server side map database 108 may be a master geographic database, but in alternate embodiments, a client side map database 108 may represent a compiled navigation database that may be used in or with end user devices (e.g., user equipment 104) to provide navigation and/or map-related functions. For example, the map database 108 may be used with the end user device 104 to provide an end user with navigation features. In such a case, the map database 108 can be downloaded or stored on the end user device (user equipment 104) which can access the map database 108 through a wireless or wired connection, such as via a processing server 102 and/or the network 112, for example.

In one embodiment, the end user device or user equipment 104 can be a navigation system, such as an in-vehicle navigation system, such as an ADAS, a personal navigation device (PND), or a portable navigation device, a cellular telephone, a smart phone, a personal digital assistant (PDA), a watch, a camera, a computer, and/or another device that can perform navigation-related functions, such as digital routing and map display. An end user can use the user equipment 104 for navigation and map functions such as guidance and map display, for example, and for determination of one or more personalized routes or route segments based on one or more calculated and recorded routes, according to some example embodiments.

The processing server 102 may receive probe data, directly or indirectly, from a mobile device 114. The mobile device 114 may include one or more detectors or sensors as a positioning system built or embedded into or within the interior of the mobile device 114. Alternatively, the mobile device 114 uses communications signals for position determination. The mobile device 114 may receive location data from a positioning system, such as a global positioning system (GPS), cellular tower location methods, access point communication fingerprinting, or the like. The server 102 may receive sensor data configured to describe a position of a mobile device, or a controller of the mobile device 114 may receive the sensor data from the positioning system of the mobile device 114. The mobile device 114 may also include a system for tracking mobile device movement, such as rotation, velocity, or acceleration. Movement information may also be determined using the positioning system. The mobile device 114 may use the detectors and sensors to provide data indicating a location of a vehicle. This vehicle data, also referred to herein as "probe data", may be collected by any device capable of determining the necessary information, and providing the necessary information to a remote entity. The mobile device 114 is one example of a device that can function as a probe to collect probe data of a vehicle.

More specifically, probe data (e.g., collected by mobile device 114) may be representative of the location of a vehicle at a respective point in time and may be collected while a vehicle is traveling along a route. While probe data is described herein as being vehicle probe data, example embodiments may be implemented with pedestrian probe data, marine vehicle probe data, or non-motorized vehicle probe data (e.g., from bicycles, skate boards, horseback, etc.). According to the example embodiment described below with the probe data being from motorized vehicles traveling along roadways, the probe data may include, without limitation, location data, (e.g. a latitudinal and longitudinal position, and/or height, GPS coordinates, proximity readings associated with a radio frequency identification (RFID) tag, or the like), rate of travel, (e.g. speed), direction of travel, (e.g. heading, cardinal direction, or the like), device identifier, (e.g. vehicle identifier, user identifier, or the like), a time stamp associated with the data collection, or the like. The mobile device 114, may be any device capable of collecting the aforementioned probe data. Some examples of the mobile device 114 may include specialized vehicle mapping equipment, navigational systems, mobile devices, such as phones or personal data assistants, or the like.

While probe data points may be collected as raw data (e.g., including raw location data, heading, speed, time, or any other relevant/available data), probe data may also be collected from third party sources, such as third party 120. As noted above, a third party may include a municipality, a governmental entity, a mobile phone service provider, a navigation system provider, a vehicle manufacturer, or the like. Devices that can generate probe data points are ubiquitous and can take a variety of forms such that numerous entities may have access to data that is considered probe data, and any of these entities may contribute to the map developer system 116 through sharing of probe data point information. While some third parties 120 may have access to copious amounts of personal data or individually-identifying data (e.g., a mobile phone number, an account holder, a vehicle owner, etc.), probe data points provided by the third party 120 to the network 112 may be limited to anonymized data or probe data points that contain only information that is beneficial to crowd-sourcing applications without the need for personally identifying information. The third party 120 may "scrub" or anonymize the probe data points before sending to the map developer 116 via the network 112, or the map developer 116 may anonymize the data upon receipt if it contains data extraneous to the core functionality of the map developer.

Given the breadth of entities that may qualify as third party providers 120 according to example embodiments described herein, the third party provider systems may vary widely in terms of the components of the system and the level of information and information detail contained in probe data points gathered by the third party 120. A third party provider that is a sophisticated location-enabled service, such as a mobile phone service provider, may include a map database 128 and processing server 122 of their own through which they can locate users, such as through GPS or through cellular signal triangulation. Such a third party provider 120 may include a map database 128 having digital map geometry stored therein onto which probe data points may be projected. The processing server may include some or all of the functionality of the processing server 102 of the map developer 116 described above. The map database 128 of the third party provider 120 may be configured in a similar manner as the map database 108 described above. The map database 128 of the third party provider 120 may be, itself, provided by another entity to the third party provider. The third party provider 120 may also have a probe data point database 126 which collects and stores probe data points of users of the third party provider 120. The probe data point database may gather probe data points in real-time or periodically from users, depending upon the planned use of such data points. The probe data point database 126, in cooperation with the processing server 122, may provide the probe data points to the map developer 116 via the network 112.

According to some embodiments, the third party provider 120 may process some or all of the probe data points before storage in the probe data point database 126 and/or before providing to the map developer 116. The processing of probe data points may include normalization of data, such as map-matching probe data points with locations on a map, such as in map database 128. For example, in an embodiment in which the third party provider is a vehicle manufacturer or a navigation system manufacturer, the probe data points collected by the third party 120, which may be from user equipment 104, for example, may be map-matched to roadways including road segments or road links within the map database as probe data points from a vehicle are typically going to be from travel along a roadway. In this manner, the third party provider 120 may compensate for GPS errors or other measurement errors that may place probe data points outside of the bounds of a typical roadway. However, not all third party providers 120 may normalize or map-match probe data points to a map, and even those third party providers that do map-match probe data points, they may not map-match all of the probe data points they collect. As such, the probe data points provided by third party providers 120 to the map developer 116 may or may not be map-matched, and the probe data points may not contain an indication as to whether they are map-matched or not.

For certain types of processing of probe data points it may be imperative to know whether the probe data points are map-matched or not. For example, probe data points that are not map-matched may be raw probe data points and processing of these probe data points may be done by the map developer 116. The map developer may be able to use such non-map-matched probe data points to establish lane-level locations within a roadway or the accuracy of the map database 108 based on the gathered non-map-matched probe data points by evaluating how closely the probe data points align with road segments or links within the map database. The non-map-matched probe data points may be considered "raw" data points whereby the map developer has the ability to process this data as desired without concern as to whether the data is truly representative of the reported location, time, heading, etc. of the probe data point from which it came.

While non-map-matched probe data points can be useful for a map developer system as described above, map-matched probe data points may also be beneficial. For example, if the map developer 116 receives probe data points that are determined to be map-matched, the map-matched probe data points can be used to compare against the map of the map database 108. Map-matched probe data points are typically map-matched to a roadway center. If a roadway (e.g., road segment or link) is defined by map-matched probe data, that defined roadway may be compared against the corresponding roadway in the map database 108.

This comparison can identify any discrepancies between the map developer map database 108 and the map database 128 of the third party provider 120 that provided the map-matched probe data points. Based on this discrepancy, an error can be identified in the map database of the map developer 116 or the third party provider 120 and rectified accordingly.

An example embodiment of a processing server 102 of map developer 116 may be embodied in an apparatus as illustrated in FIG. 2. The apparatus, such as that shown in FIG. 2, may be specifically configured in accordance with an example embodiment of the present invention for determining whether probe data points are map-matched or not. Map-matched probe data points are described herein as probe data points that have been normalized from their original, raw location data to correspond to a road segment proximate the original, raw location data. Conversely, non-map-matched probe data points are probe data points that retain their raw location data that has not been normalized to correspond to a road segment. The apparatus 200 may include or otherwise be in communication with a processor 202, a memory device 204, a communication interface 206, and a user interface 208. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processor 202). The memory device may be configured to store information, data, content, applications, instructions, or the like, for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

The processor 202 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 202 may be configured to execute instructions stored in the memory device 204 or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor specific device (for example, a mobile terminal or a fixed computing device) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

The apparatus 200 of an example embodiment may also include a communication interface 206 that may be any means such as a device or circuitry embodied in either hardware or a combination of hardware and software that is configured to receive and/or transmit data to/from a communications device in communication with the apparatus, such as to facilitate communications with one or more user equipment 104 or the like. In this regard, the communication interface may include, for example, an antenna (or multiple antennae) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware and/or software for supporting communication via cable, digital subscriber line (DSL), universal serial bus (USB) or other mechanisms.

The apparatus 200 may also include a user interface 208 that may in turn be in communication with the processor 202 to provide output to the user and, in some embodiments, to receive an indication of a user input. As such, the user interface may include a display and, in some embodiments, may also include a keyboard, a mouse, a joystick, a touch screen, touch areas, soft keys, one or more microphones, a plurality of speakers, or other input/output mechanisms. In one embodiment, the processor may comprise user interface circuitry configured to control at least some functions of one or more user interface elements such as a display and, in some embodiments, a plurality of speakers, a ringer, one or more microphones and/or the like. The processor and/or user interface circuitry comprising the processor may be configured to control one or more functions of one or more user interface elements through computer program instructions (for example, software and/or firmware) stored on a memory accessible to the processor (for example, memory device 204, and/or the like).

Example embodiments of the present invention may provide a mechanism for establishing whether probe data points are map-matched or not. Embodiments described herein relate to identifying probe trajectories that have been map-matched by a provider of the probe data point. When a probe data point has been map-matched, the original probe data point location (e.g., latitude, longitude, and possibly altitude) have been projected (i.e., moved) from its original (noisy) GPS location on to the road segment centerline of the map in the map database. Therefore, when a probe data point provider has map-matched its probe data points, they will generally reside on the road segment centerline of the map geometry that was used for map matching. FIG. 3 illustrates an example embodiment of probe data that has been map-matched. As shown, the probe data points 310 align with the roadways of the map 300 and more particularly, align with one another such that there is little "noise" or probe data points outside of roadway paths.

However, third party providers often aggregate probe data points from multiple sources that may contain a mix of map-matched and non-map-matched probe data point trajectories, as shown in FIG. 4. As shown, the probe data points 410 are noisy around the roadways of the map 400. While generally concentrated around roadway centers, it is evident that at least some of the probe data points of FIG. 4 are not map-matched as they lie significantly outside of the roadways of the map 400. In cases such as that of FIG. 4, however, it is not readily apparent which probe data points, if any, have been map-matched. It is imperative for certain data processing methods to be able to distinguish probe data points that have been map-matched from those that have not been map-matched.

Map-matching of probe data points introduces bias and artifacts in the probe data points and may negatively influence probe data processing techniques, such as inferring road center geometry, stay point identification, and detecting lane geometry and lane attributes. Being able to identify provider map-matched probe data points enables the segregation of map-matched probe data points from non-map-matched probe data points which can then be processed using the aforementioned probe data processing techniques among other processing methods. Retaining only map-matched probe data points enables the identification of third party provider road geometry that may be useful for change detection in roadway paths to help keep the map database 108 of the map service provider 116 up to date.

In order to identify which probe data points have been map-matched (e.g., projected onto their map centerline geometry) by the probe data provider, embodiments described herein compute a provider map-matched confidence value based on the fraction of vertices of the probe data points that have been map matched. To determine if a vertex of a probe data point has been map-matched or not, a probe density histogram is first created. There are two manners in which such histograms can be created. The first method is to divide the area proximate a road segment into a grid and determine the number of probe data points in each cell of the grid. This is a two-dimensional histogram, where the value of each cell of the map proximate the road segment includes a value representing the number of probe data points in that cell. The second method is a one-dimensional histogram of a cross-section of a road segment where the distance dimension along the road segment is removed. This road section cross section histogram for each link is created using histogram bins that discretize the map-matching distance to the road map centerline based on the assumption that the road centerline geometry is fairly similar and parallel to the third party provider map geometry. Two-dimensional histogram cells or one-dimensional road cross section bins that are map-matched form spikes, as shown in FIG. 5, with respect adjacent cells or bins perpendicular to the road direction.

Creating a two-dimensional histogram has an advantage in that no map-matching against a mapped road segment of the map database 108 is necessary, but a two-dimensional histogram produced according to the methods described herein may require higher probe density than the one-dimensional histogram. Further, low probe density or non-uniform probe data point density may yield insufficient probe data point density to detect all cells that correspond to the third party provider map geometry.

Creating a one-dimensional cross-section histogram of the road geometry may provide the advantage that it can be matched to the road segment of the map database 108 of the map service provider to match distances along the entire road link, thus requiring lower probe data point density to form and identify the histogram peaks in the data from the third party provider. However, the one-dimensional cross-section histogram is based on an assumption that the map road centerline geometry of the map database 108 is substantially parallel to the third part provider map road centerline geometry. Any misalignment between the two maps may artificially widen the width of the third party provider map matched spike location and thus yield false positives for classifying probe data point vertices as map-matched.

FIG. 5 illustrates a road segment 510 of a map 500 where at least some of the probe data points are not map-matched as evidenced by the noise around the road segment 510. The histogram 520 of FIG. 5 illustrates the probe data point volume along the y-axis and the position across the roadway cross section along the x-axis. As shown, a spike 530 exists in the probe data of the histogram, but so too does an apparent normal distribution 540 of probe data points, suggesting that some, but not all of the probe data points shown are map-matched. While FIG. 5 illustrates a substantially normal distribution, the histogram may take any form based on the probe data points received. This could include multi-modal distribution, skewed distribution, comb distribution, edge peak distribution, etc.

Once the histogram has been generated, as shown in FIG. 5, using the probe data points and either the one-dimensional histogram or the two-dimensional histogram, the next step is to determine which cells (2D) or bins (1D) correspond to the third party provider's map location. Probe data points that are not map-matched will spread out in a distribution along the x-axis of the histogram due to GPS noise, and the spread may extend beyond the road surface width. However, probe data points that are provider map-matched may be projected onto their road map centerline and thus accumulate to form spikes for both histogram types. Identification of such map-matched artifact spikes can be accomplished using example embodiments herein through robust statistics techniques, including the median. If the histogram cell/bin value is significantly larger than the neighborhood median, then it constitutes a spike for the cell/bin. Optionally, discrete edge detection techniques such as the Sobel operator may be used to identify spike locations in the histogram. Using a binary classification scheme, a value of one can be assigned to cells/bins of the histogram on the spike location, and a zero value to all other cells/bins.

While the example embodiment of FIG. 5 illustrates a single spike or peak, embodiments may include a plurality of peaks. Multiple peaks can be indicative of a probe data points map-matched to different lanes across a multi-lane roadway, or potentially represent probe data points map-matched to two different map geometries, such as with probe data points coming from multiple sources. In either scenario, the determination as to whether the probe data points are map-matched may be performed in a similar manner. If probe data points are map-matched to two different map geometries, the probe data points may be from different providers and may be separated by provider as needed for probe data analysis. This may be done before or after determining whether the probe data points are map-matched as will be apparent based on the methods described herein for establishing whether probe data points are map-matched or not.

According to an example embodiment including a two-dimensional array of probe data points covering a geographic area, for a two-dimensional area histogram cell:

$$c_{ij} = \begin{cases} 1 & \text{if spike cell} \\ 0 & \text{if non spike cell} \end{cases}$$

According to an example embodiment including a one-dimensional array of probe data points across the width of a road segment, for a one-dimensional cross-section histogram:

$$b_k = \begin{cases} 1 & \text{if spike bin} \\ 0 & \text{if non spike bin} \end{cases}$$

The cell/bin classification can also be non-binary, with a range from [0,1] or modeled, such as using a bell curve or parabola modeling of decreasing confidence the further away from the center peak location. With such a non-binary classification scheme, example embodiments could compensate for any inaccuracy in the location of the map cells/bins. One such classification scheme may be based on the classification value being one at the peak center and decreasing to zero some distance, $D_{max}$, away from the road center geometry. The value of $D_{max}$ could, for example, be defined as:

$$D_{max} = \frac{\text{peak\_width} + \text{cell\_width}}{2}$$

Using a parabolic drop-off function, such as $$y(d) = \text{MAX}\left(0, 1 - \left(\frac{d}{D_{max}}\right)^2\right)$$

would yield:
For two-dimensional area histogram cells:

$$c_{ij} = \begin{cases} \text{MAX}\left(0, 1 - \left(\frac{d}{D_{max}}\right)^2\right) & \text{if spike cell} \\ 0 & \text{if non spike cell} \end{cases}$$

And for one-dimensional cross-section histograms:

$$b_k = \begin{cases} \text{MAX}\left(0, 1 - \left(\frac{d}{D_{max}}\right)^2\right) & \text{if spike bin} \\ 0 & \text{if non spike bin} \end{cases}$$

Another non-binary classification scheme could be based on the histogram peak value $h_{ij}$ divided by the maximum histogram peak value $h_{max}$:
Using a drop-off function, such as for two-dimensional area histogram cells:

$$c_{ij} = \begin{cases} h_{ij}/h_{max} & \text{if spike cell} \\ 0 & \text{if non spike cell} \end{cases}$$

And for one-dimensional cross-section histograms:

$$b_k = \begin{cases} h_k/h_{max} & \text{if spike bin} \\ 0 & \text{if non spike bin} \end{cases}$$

In order to determine for each probe data point if it is map-matched or not, each probe data point may be assigned the cell/bin classification value $c_{ij}$ or $b_k$ of the cell/bin into which the probe data point falls. While this technique can be used to establish which probe data points correspond to a map-matched position in the histogram, embodiments described herein may determine if probe data is map matched based on the trajectory of a respective probe apparatus. A trajectory for a probe apparatus includes a plurality of probe data points generated by a single probe apparatus, resulting in a trajectory of the path of that probe apparatus. Each trajectory can be analyzed to establish whether the probe data points from the corresponding probe apparatus are map matched, even if some of the probe data points do not fall within a peak of a histogram. For example, if a trajectory includes ten probe data points, and nine of them are established to be map-matched, it is likely that the $10^{th}$ probe data point is also map-matched, even if it does not fall into a peak of the histogram. To evaluate whether a trajectory from a probe apparatus is map-matched by the provider, a probability may be computed as to whether it is likely that the probe data points of that trajectory are map-matched.

According to an example embodiment, the unadjusted probability p that a trajectory with $n$ probe data point vertices is provider map matched may be calculated based on the following:

$$p(\text{is provider map matched}) = \frac{1}{n}\sum_{i=1}^{n} v_i$$

Where $v_i$ is the provider map match classification value according to which bin/cell a vertex (probe data point) within the trajectory falls, and $n$ is the number of vertices or probe data points within the trajectory for a respective probe apparatus.

However, for trajectories with few probe data points (vertices) there would be a low confidence in the probe data point probability value, and for trajectories with a large number of probe data points there would be a high confidence in the probability value.

To determine a methodology for lowering the probability value as a function of the count of probe data points, a Margin of Error (ME) from poll survey statistics can be used to lower our confidence as a function of the number of probe data point vertices in a trajectory. The margin of error may be computed for a desired Confidence Level, e.g., 95%. The margin of error is a statistic that describes the amount of random sampling error in a survey. The larger the margin of error, the less confidence in the estimate p (probability) for whether the probe data points for a trajectory are map-matched or not. The margin of error may be computed as the $z$-score, $z$ times the standard error (SE), where the standard error for a sample proportion p is:

$$SE = \sqrt{\frac{p(1-p)}{n}}$$

So that the margin of error becomes:

$$ME = z\sqrt{\frac{p(1-p)}{n}}$$

The $z$-score, which is the number of standard deviations from the mean at which a point is located for a desired Confidence Level, e.g., 95%. For a 95% Confidence Interval, i.e., $P(-z \leq Z \leq z)=0.95$, we have:

$$P(-z \leq Z \leq z)=1-\alpha=0.95, \text{ yielding } \alpha=0.05$$

So that the cumulative distribution function $$\Phi(z) = 1 - \frac{\alpha}{2} = 1 - \frac{0.05}{2} = 0.975,$$

yielding a $z$-score of:

$$z=1/\Phi^{-1}(0.975)=1.96$$

Where $\Phi(z)$ denotes the standard normal cumulative distribution function which describes the probability that a real-valued random variable z with a given probability distribution, such as a normal probability distribution, will be found to have a value less than or equal to z. Thus, $\Phi^{-1}(x)$ is the inverse standard normal cumulative distribution function. By using the margin of error, the probability p that a trajectory with $n$ probe data point vertices is map-matched by a third party provider is lowered by subtracting the margin of error:

$$p_{adjusted} = \text{MAX}(0, p_{unadjusted} - ME) = \text{MAX}\left(0, p_{unadjusted} - z\sqrt{\frac{p(1-p)}{n}}\right)$$

However, the standard error (SE) may be close to zero for a p value close to zero and one. Thus, if a trajectory with few probe data point vertices (e.g., two), all fall within spike cells/bins, p=1, so the margin of error becomes zero, thus not reducing the confidence. Therefore, a maximum margin of error that occurs for p=0.5 may be used. By doing so, the formula becomes:

$$p_{adjusted} = \text{MAX}\left(0, p_{unadjusted} - z\sqrt{\frac{0.5(1-0.5)}{n}}\right)$$

Which can be rewritten as:

$$p_{adjusted} = \text{MAX}\left(0, \frac{1}{n}\sum_{i=1}^{n} v_i - z\sqrt{\frac{0.25}{n}}\right)$$

Where $v_i$ is the provider map match classification value according to which bin/cell the probe data point vertex falls within, $n$ is the number of probe data point vertices in the trajectory, and $z$ is the z-value for the desired confidence interval.

FIG. 6 illustrates a color-coded map of probe data points where probe data points/trajectories that are determined to be map-matched with a high degree of confidence or probability (i.e., close to one) fall along the centerlines of the roadways of the map 600, while the probe data points/trajectories with a low degree of confidence or probability (i.e., close to zero) are noisy and lie in a spread-out distribution along the road ways, as one would expect non-map-matched probe data points to fall. The probability thresholds for whether a trajectory is map-matched can be user-adjusted as desired such that if the minimum probability threshold is lowered, a denser road geometry may be established similar to that of FIG. 3. However, some trajectories may only have a few probe data points. When the trajectory probe data point count is low, such as one or two probe data point vertices (or below some minimum threshold), the trajectory may be established as non-classifiable since the confidence in either classification value would be low due to the low probe data point vertex count. Therefore, only trajectories with high vertex counts are used to circumvent this issue and provide reliable estimation as to whether probe data points are map-matched.

FIG. 7 illustrates a flowchart illustrative of a method according to example embodiments of the present invention. It will be understood that each block of the flowcharts and combination of blocks in the flowcharts may be implemented by various means, such as hardware, firmware, a processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 204 of an apparatus employing an embodiment of the present invention and executed by a processor 202 of the apparatus. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions, which execute on the computer or other programmable apparatus, provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems, which perform the specified functions, or combinations of special purpose hardware and computer instructions.

FIG. 7 illustrates a method of determining whether probe data points are map-matched or non-map-matched such that the probe data can be processed and analyzed appropriately without introducing bias into the analysis, which may be caused by map-matching ahead of analysis. At 610, probe data points are received, where the probe data points are generated by probe apparatuses associated with a plurality of vehicles. The probe apparatuses may include a plurality of sensors and may be on, within, or otherwise attached to a vehicle. Each probe data point may include location information associated with the respective probe apparatus. For each of the probe data points, a location and an associated road segment corresponding to the location may be determined as shown at 620. From the probe data points associated with the first road segment, a probe density histogram for the road segment may be generated as shown at 630, where the probe density histogram represents a volume of probe data points at each of a plurality of positions across a width of the road segment. Based on the probe density histogram, probe data points that are determined to be map-matched are classified as such as shown at 640, while probe data points determined, based on the probe density histogram, to be non-map-matched are classified as such at 650. The probe data points classified as map-matched may be analyzed with respect to a position of a road segment of a digital map corresponding to the map-matched road segment. Probe data points classified as non-map-matched may be analyzed to establish one or more of lane position, lane-based traffic flow, or road center line accuracy.

In an example embodiment, an apparatus for performing the method of FIG. 7 above may comprise a processor (e.g., the processor 202) configured to perform some or each of the operations (610-650) described above. The processor may, for example, be configured to perform the operations (610-650) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 610-650 may comprise, for example, the processor 202 and/or a device or circuit for executing instructions or executing an algorithm for processing information as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A mapping system comprising:
a memory comprising map data; and
processing circuitry configured to:
receive probe data points associated with a plurality of vehicles, each probe data point received from a probe apparatus of a plurality of probe apparatuses, each probe apparatus comprising one or more sensors and being onboard a respective vehicle, wherein each probe data point comprises location information associated with the respective probe apparatus;
for each of the probe data points, determine a location and a road segment corresponding to the location;
generate, from the probe data points associated with a first road segment, a probe density histogram for the first road segment, wherein the probe density histogram represents a volume of probe data points at each of a plurality of positions across a width of the road segment;
identify, based on the probe density histogram, probe data points that are determined to be map-matched and classify the probe data points determined to be map-matched as map-matched probe data points; and
identify, based on the probe density histogram, probe data points that are determined to be non-map-matched and classify the probe data points determined to be non-map-matched as non-map-matched probe data points;
wherein probe data points classified as map-matched are analyzed with respect to a position of a road segment of a digital map corresponding to the map-matched road segment;
wherein probe data points classified as non-map-matched are analyzed to establish one or more of lane position, lane-based traffic flow, or road center-line accuracy;
wherein the probe data points associated with a plurality of vehicles are received from a probe data provider, and wherein the probe data provider is classified according to whether the probe data provided is classified as map-matched, as non-map matched, or as a combination of map-matched and non-map-matched.

2. The mapping system of claim 1, wherein in response to the probe data provider being classified as providing a combination of map-matched and non-map-matched probe data, the processing circuitry being further configured to determine a proportion of the probe data points classified as map-matched and a proportion of the probe data points classified as non-map-matched, and classifying the probe data provider according to the proportions determined.

3. The mapping system of claim 1, wherein the probe data points are grouped into bins at each of the plurality of positions across the width of the road segment, wherein the processing circuitry configured to identify probe data points that are determined to be map-matched comprises causing the processing circuitry to:
identify a relatively high proportion of probe data points grouped to at least one of the plurality of positions across the width of the road segment, wherein the relatively high proportion of probe data points is established based on a statistically significant deviation at the at least one of the plurality of positions across the width of the road segment relative to the probe density histogram adjacent the at least one of the plurality of positions; and identify the probe data points grouped to the at least one of the plurality of positions across the width of the road segment as map-matched and classify the probe data points grouped to the at least one of the plurality of positions as map-matched probe data points.

4. The mapping system of claim 1, further comprising causing the processing circuitry to:

identify a peak in the probe density histogram;

assign probe data points at a position across the width of the road segment corresponding to the peak in the probe density histogram a peak value;

assign probe data points at positions along the width of the road segment values corresponding to their position relative to the peak in the probe density histogram, where values assigned are inversely proportional to a distance of the position across the width of the road segment from the peak; and wherein causing the processing circuitry to identify, based on the probe density histogram, probe data points that are determined to be map-matched and classify the probe data points determined to be map-matched as map-matched probe data points comprises identifying probe data points having a value satisfying a predetermined threshold as map-matched probe data points.

5. The mapping system of claim 1, wherein the processing circuitry is further configured to:

calculate, for probe data points from each probe apparatus, a probability that the respective probe data points are map-matched based on a proportion of the probe data points from the respective probe apparatus corresponding to a peak in the probe density histogram, wherein a peak in the probe density histogram comprises a relatively high proportion of probe data points grouped to at least one of the plurality of positions across the width of the road segment, wherein the relatively high proportion of probe data points is established based on a statistically significant deviation at the at least one of the plurality of positions across the width of the road segment relative to the probe density histogram adjacent the at least one of the plurality of positions.

6. The mapping system of claim 5, wherein the processing circuitry is further configured to:

determine a confidence value of the probability for probe data points from each probe apparatus, wherein the confidence value is determined based on a number of probe data points from a respective probe apparatus, wherein the confidence value of the probability is proportional to a number of probe data points from the respective probe apparatus.

7. The mapping system of claim 6, wherein the probe data points from a respective probe apparatus are identified as map-matched in response to the probability that the respective probe data points are map-matched satisfying a predetermined probability and the confidence value of the probability for the probe data points from the respective probe apparatus satisfying a predetermined confidence value.

8. An apparatus comprising at least one processor and at least one memory including computer program code, the at least one memory and computer program code configured to, with the processor, cause the apparatus to at least:

receive probe data points associated with a plurality of vehicles, each probe data point received from a probe apparatus of a plurality of probe apparatuses, each probe apparatus comprising one or more sensors and being onboard a respective vehicle, wherein each probe data point comprises location information associated with the respective probe apparatus;

for each of the probe data points, determine a location and a road segment corresponding to the location;

generate, from the probe data points associated with a first road segment, a probe density histogram for the first road segment, wherein the probe density histogram represents a volume of probe data points at each of a plurality of positions across a width of the road segment;

identify, based on the probe density histogram, probe data points that are determined to be map-matched and classify the probe data points determined to be map-matched as map-matched probe data points; and identify, based on the probe density histogram, probe data points that are determined to be non-map-matched and classify the probe data points determined to be non-map-matched as non-map-matched probe data points;

wherein probe data points classified as map-matched are analyzed with respect to a position of a road segment of a digital map corresponding to the map-matched road segment;

wherein probe data points classified as non-map-matched are analyzed to establish one or more of lane position, lane-based traffic flow, or road centerline accuracy; and wherein the probe data points associated with a plurality of vehicles are received from a probe data provider, and wherein the probe data provider is classified according to whether the probe data provided is classified as map-matched, as non-map matched, or as a combination of map-matched and non-map-matched.

9. The apparatus of claim 8, wherein in response to the probe data provider being classified as providing a combination of map-matched and non-map-matched probe data, determining a proportion of the probe data points classified as map-matched and a proportion of the probe data points classified as non-map-matched, and classifying the probe data provider according to the proportions determined.

10. The apparatus of claim 8, wherein the probe data points are grouped into bins at each of the plurality of positions across the width of the road segment, wherein the apparatus caused to identify probe data points that are determined to be map-matched comprises causing the apparatus to:

identify a relatively high proportion of probe data points grouped to at least one of the plurality of positions across the width of the road segment, wherein the relatively high proportion of probe data points is established based on a statistically significant deviation at the at least one of the plurality of positions across the width of the road segment relative to the probe density histogram adjacent the at least one of the plurality of positions; and identify the probe data points grouped to the at least one of the plurality of positions across the width of the road segment as map-matched and classify the probe data points grouped to the at least one of the plurality of positions as map-matched probe data points.

11. The apparatus of claim 8, further comprising causing the apparatus to:

identify a peak in the probe density histogram;
assign probe data points at a position across the width of the road segment corresponding to the peak in the probe density histogram a peak value;
assign probe data points at positions along the width of the road segment values corresponding to their position relative to the peak in the probe density histogram, where values assigned are inversely proportional to a distance of the position across the width of the road segment from the peak; and
wherein causing the processing circuitry to identify, based on the probe density histogram, probe data points that are determined to be map-matched and classify the probe data points determined to be map-matched as map-matched probe data points comprises identifying probe data points having a value satisfying a predetermined threshold as map-matched probe data points.

12. The apparatus of claim 8, wherein the apparatus is further caused to:
calculate, for probe data points from each probe apparatus, a probability that the respective probe data points are map-matched based on a proportion of the probe data points from the respective probe apparatus corresponding to a peak in the probe density histogram, wherein a peak in the probe density histogram comprises a relatively high proportion of probe data points grouped to at least one of the plurality of positions across the width of the road segment, wherein the relatively high proportion of probe data points is established based on a statistically significant deviation at the at least one of the plurality of positions across the width of the road segment relative to the probe density histogram adjacent the at least one of the plurality of positions.

13. The apparatus of claim 12, wherein the apparatus is further caused to:
determine a confidence value of the probability for probe data points from each probe apparatus, wherein the confidence value is determined based on a number of probe data points from a respective probe apparatus, wherein the confidence value of the probability is proportional to the number of probe data points from the respective probe apparatus.

14. The apparatus of claim 13, wherein the probe data points from a respective probe apparatus are identified as map-matched in response to the probability that the respective probe data points are map-matched satisfying a first predetermined probability and the confidence value of the probability for the probe data points from the respective probe apparatus satisfying a predetermined confidence value.

15. A computer program product comprising at least one non-transitory computer-readable storage medium having computer-executable program code portions stored therein, the computer-executable program code portions comprising program code instructions configured to:
receive probe data points associated with a plurality of vehicles, each probe data point received from a probe apparatus of a plurality of probe apparatuses, the probe apparatus comprising a plurality of sensors and being onboard a respective vehicle, wherein each probe data point comprises location information associated with the respective probe apparatus;
for each of the probe data points, determine a location and a road segment corresponding to the location;
generate, from the probe data points associated with a first road segment, a probe density histogram for the first road segment, wherein the probe density histogram represents a volume of probe data points at each of a plurality of positions across a width of the road segment;
identify, based on the probe density histogram, probe data points that are determined to be map-matched and classify the probe data points determined to be map-matched as map-matched probe data points; and
identify, based on the probe density histogram, probe data points that are determined to be non-map-matched and classify the probe data points determined to be non-map-matched as non-map-matched probe data points;
wherein probe data points classified as map-matched are analyzed with respect to a position of a road segment of a digital map corresponding to the map-matched road segment; and
wherein probe data points classified as non-map-matched are analyzed to establish one or more of lane position, lane-based traffic flow, or road centerline accuracy;
wherein the probe data points associated with a plurality of vehicles are received from a probe data provider, and wherein the probe data provider is classified according to whether the probe data provided is classified as map-matched, as non-map matched, or as a combination of map-matched and non-map-matched.

16. The computer program product of claim 15, wherein in response to the probe data provider being classified as providing a combination of map-matched and non-map-matched probe data, determining a proportion of the probe data points classified as map-matched and a proportion of the probe data points classified as non-map-matched, and classifying the probe data provider according to the proportions determined.

17. The computer program product of claim 15, wherein the probe data points are grouped into bins at each of the plurality of positions across the width of the road segment, wherein the processing circuitry configured to identify probe data points that are determined to be map-matched comprises program code instructions configured to:
identify a relatively high proportion of probe data points grouped to at least one of the plurality of positions across the width of the road segment, wherein the relatively high proportion of probe data points is established based on a statistically significant deviation at the at least one of the plurality of positions across the width of the road segment relative to the probe density histogram adjacent the at least one of the plurality of positions; and
identify the probe data points grouped to the at least one of the plurality of positions across the width of the road segment as map-matched and classify the probe data points grouped to the at least one of the plurality of positions as map-matched probe data points.

* * * * *